(12) United States Patent
Ziemer et al.

(10) Patent No.: US 9,631,701 B2
(45) Date of Patent: Apr. 25, 2017

(54) PLANETARY GEARSET

(71) Applicant: ZF Friedrichshafen AG, Friedrichshafen (DE)

(72) Inventors: Peter Ziemer, Tettnang (DE); Andreas Beisswenger, Aulendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/706,255

(22) Filed: May 7, 2015

(65) Prior Publication Data
US 2015/0323061 A1 Nov. 12, 2015

(30) Foreign Application Priority Data
May 9, 2014 (DE) .................. 10 2014 208 793

(51) Int. Cl.
*F16H 1/28* (2006.01)
*F16H 57/08* (2006.01)
*F16H 3/66* (2006.01)

(52) U.S. Cl.
CPC .......... *F16H 1/2863* (2013.01); *F16H 1/2809* (2013.01); *F16H 57/082* (2013.01); *F16H 3/663* (2013.01); *F16H 2001/2881* (2013.01); *F16H 2200/201* (2013.01)

(58) Field of Classification Search
CPC ........ F16H 1/36; F16H 1/2809; F16H 1/2863; F16H 3/58; F16H 3/663; F16H 57/082; F16H 2001/2881; F16H 2200/201
See application file for complete search history.

(56) References Cited

U.S. PATENT DOCUMENTS

| | | | |
|---|---|---|---|
| 2,901,923 A | 9/1959 | Waclawek |
| 2,995,956 A | 8/1961 | Moore |
| 4,014,223 A | 3/1977 | Pierce, Jr. |
| 6,663,529 B1 | 12/2003 | Haka |
| 7,011,599 B2 | 3/2006 | Becquerelle et al. |
| 2003/0017905 A1 | 1/2003 | Butz |
| 2003/0232685 A1 | 12/2003 | Sugihara et al. |
| 2007/0037657 A1 | 2/2007 | Thomas et al. |

(Continued)

FOREIGN PATENT DOCUMENTS

| | | |
|---|---|---|
| CN | 201 772 042 | 3/2011 |
| DE | 42 16 402 A1 | 9/1992 |

(Continued)

OTHER PUBLICATIONS

German Search Report, Mar. 6, 2015.

*Primary Examiner* — Jacob S Scott
(74) *Attorney, Agent, or Firm* — Dority & Manning, P.A.

(57) ABSTRACT

A planetary gear set has a sun gear, multiple planetary gears mounted on a planetary carrier, and a ring gear enclosing the planetary gears, which is designed in split form perpendicular to its axis of rotation and is formed from two ring gear parts arranged coaxially to each other. An adapter component that, for the purpose of a torque-transferring or torque-supporting operative connection of the planetary carrier, is connected in a torque-proof manner to an additional component in a mounted state with the planetary carrier, and is guided, viewed radially, outward by the ring gear parts.

6 Claims, 2 Drawing Sheets

(56) References Cited

U.S. PATENT DOCUMENTS

| | | | |
|---|---|---|---|
| 2008/0119318 A1* | 5/2008 | Phillips | F16H 3/663 |
| | | | 475/276 |
| 2009/0036259 A1* | 2/2009 | Carey | F16H 3/66 |
| | | | 475/284 |
| 2010/0125017 A1 | 5/2010 | Thomas et al. | |
| 2012/0225748 A1 | 9/2012 | Michel et al. | |
| 2014/0378270 A1* | 12/2014 | Janson | F16H 3/66 |
| | | | 475/288 |

FOREIGN PATENT DOCUMENTS

| | | |
|---|---|---|
| EP | 0 385 345 | 9/1990 |
| GB | 2 429 248 A | 2/2007 |

* cited by examiner

PLANETARY GEARSET

FIELD OF THE INVENTION

The present invention relates to a planetary gear set comprising a sun gear, multiple planetary gears mounted on a planetary carrier, also called a bar, and a ring gear enclosing the planetary gears, which is designed in split form perpendicular to its axis of rotation and is formed from two ring gear parts arranged coaxially to each other.

BACKGROUND OF THE INVENTION

Planetary gear sets of the aforementioned type are often used in automatic transmissions, which comprise planetary gear sets and are shifted by means of friction or shift elements, such as clutches and brakes and are typically connected to a start-up element subject to a slip effect and provided with a lock-up clutch, such as a hydrodynamic torque converter or a fluid coupling.

Thereby, certain planetary gear set couplings have proved to be advantageous for various reasons. For example, so-called "Simpson planetary gear sets," with which a planetary carrier of a planetary gear set is connected to the ring gear of another planetary gear set and their two sun gears, have proved to be advantageous based on the low component load. In addition, Ravigneaux planetary gear sets are often used, with which two planetary gear sets are combined or reduced to a planetary gear set with a common bar and a common ring gear. This arrangement has the advantage that the number of required components is kept low. In addition, based on their high number of achievable gears with good gradation and their low construction costs, Lepelletier planetary gear sets are often used, which consist of one simple upstream planetary gear set and one main gear set formed from two dual-coupled individual planetary gear sets; thereby, the main planetary gear set is usually designed in the form of Ravigneaux planetary gear set, based on its binding ability.

However, in a disadvantageous manner, combinations of certain planetary gear set couplings are not realizable, based on their lack of binding ability. For example, a main gear set designed as a Simpson planetary gear cannot be easily integrated into a Lepelletier gear set.

In order to establish binding ability, within the framework of US 2010/0125017 A1, a planetary gear set with a sun gear designed in split form is proposed, by which a connection of the bar of the planetary gear set, viewed radially, inwards between the two components of the split sun gear to a shift element is enabled. In addition, within the framework of US 2010/0125017 A1, for the extension of the binding ability of elements of a transmission in planetary design, it is proposed to design in split form a ring gear of a planetary gear set perpendicular to its axis of rotation. Thereby, a brake is connected to the planetary carrier of the planetary gear set, by which the mounting of the two ring gear parts and the intermediate penetration part required for the brake is possible only from the opposite side. A ring gear designed in split form is described within the framework of GB 2429248A. Thereby, the ring gear parts designed in split form and the sun gears designed in split form are in operative connection with each other through at least one planetary gear that is designed to be long when viewed axially.

A ring gear with internal toothing is known from US2012/225748 which is split into at least two parts that are movable relative to one another, which are mounted on a common carrier element.

In addition, a split ring gear arises from CN201772042, wherein its two parts are connectable to each other by means of a connecting disk.

A ring gear of a planetary gear set designed as a sintered component arises from US 2003/017905 A, which consists of two off-tool halves, which, without subsequent shape-cutting, are assembled free of backlash after the insertion of moving jacks, whereas the halves of the ring gear are aligned with each other in such a manner that they are mutually supported by means of radial guides and torsional stops. Thereby, the halves of the ring gear are not axially fixed with each other, and, in their mounted state, are fixed by planetary gear carriers and one control part.

In addition, a ring gear of a planetary gear set is known from DE 4216402 A1, which is formed from two ring gear parts that, viewed axially, are arranged next to each other, each of which is provided with tooth bevels directed opposite to each other, whereas the two ring gear parts are welded together.

In automatic transmissions comprising planetary gear sets, it is known from the state of the art that the planetary carriers of planetary gear sets are, based on their relatively high mass, to be centered by slide bearings or radial needle roller bearings, while the sun gears or ring gears are in turn centered on the planetary carrier through the planetary gears.

Due to the typically used helical toothed running gears, axial forces arise on the sun gears and ring gears of planetary gear sets, while, in principle, the planetary carriers remain free of axial forces. Thereby, as a general rule, axial forces are derived on the sun gears or ring gears directly by means of, for example, axial needle bearings or grooved ball bearings or indirectly by means of coupled components, such as planetary carriers or additional sun gears or ring gears, in the housing or in its housing cover.

SUMMARY OF THE INVENTION

The present invention is subject to a task of specifying a planetary gear set that is advantageously structured, particularly with respect to mountability, comprising a sun gear, multiple planetary gears mounted on a planetary carrier and a ring gear enclosing the planetary gears, which is designed in split form perpendicular to its axis of rotation and is formed from two ring gear parts arranged coaxially to each other. The planetary carrier is, through the two ring gear parts, in operative connection with an additional component for the purpose of transferring or supporting torque. Additional objects and advantages of the invention will be set forth in part in the following description, or may be obvious from the description, or may be learned through practice of the invention.

Accordingly, a planetary gear set is proposed, comprising a sun gear, multiple planetary gears mounted on a planetary carrier, and a ring gear enclosing the planetary gears, which is designed in split form perpendicular to its axis of rotation and is formed from two ring gear parts arranged coaxially to each other, which includes an adapter component that, for the purpose of a torque-transferring or torque-supporting operative connection of the planetary carrier, is connected in a torque-proof manner to an additional component in a mounted state with the planetary carrier, and is guided, viewed radially, outward by the ring gear parts.

The part of the adapter component guided, viewed radially, outward by the ring gear parts is connected to the additional component for the purpose of transferring or supporting torque. The additional component may be, for example, a brake, a clutch or a shaft.

The adapter component and the planetary carrier preferably feature means for the establishment of a torque-proof, positive-locking connection between the adapter component and the planetary carrier in a mounted state.

Within the framework of one embodiment, the adapter component features axially extending fingers and, after the mounting of one ring gear part, is axially slid on the planetary carrier of the planetary gear set up to a stop. By means of the fingers, the adapter component correspondingly grips on the planetary carrier, in the circumferential direction between the toothing brought into the planetary gears, by which a torque-proof connection between the adapter component and the planetary carrier is achieved and the centering of the adapter component takes place.

The axial fixing of the adapter component is effected through a retaining ring mounted in a preferably inner groove in the planetary carrier and the adapter component.

Through the conception in accordance with the invention, in a simple and cost-effective manner, the binding ability of the planetary carrier of a planetary gear set, comprising a ring gear that is designed in split form perpendicular to its axis of rotation and is formed from two ring gear parts arranged coaxially to each other, whereas, at the same time, a simple axial fixing and centering of the planetary carrier is enabled.

BRIEF DESCRIPTION OF THE DRAWINGS

In the following, the invention is more specifically illustrated as an example on the basis of the attached Figures. The following are shown in these.

DETAILED DESCRIPTION

Figure 1:
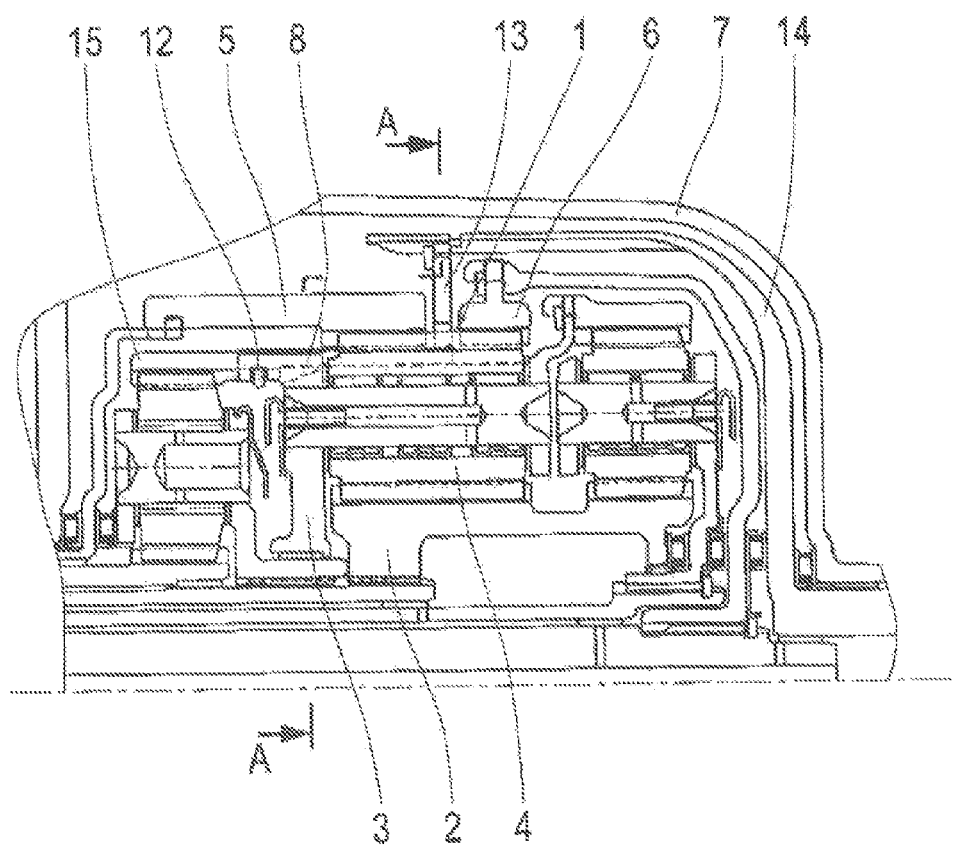
FIG. 1: a section view of a planetary gear set designed in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a planetary gear set 1, arranged in a housing 7, of a transmission in planetary design, which comprises a sun gear 2, multiple planetary gears 4 mounted on a planetary carrier 3, and a ring gear enclosing the planetary gears 4, whereas the ring gear is designed in split form perpendicular to its axis of rotation and is formed from a first ring gear part 5 and a second ring gear part 6, which are arranged coaxially to each other in a mounted state.

As can be derived from FIG. 1, for the purpose of a torque-transferring or torque-supporting operative connection of the planetary carrier 3, an adapter component 8 is provided with an additional component, which, in the example shown, after the mounting of the second ring gear part 6, is axially slid on the planetary carrier 3 of the planetary gear set 1 up to a stop and thereby, by means of axially extending fingers, correspondingly grips on the planetary carrier 3 in the circumferential direction between the toothing brought into the planetary gears 4, by which, in a mounted state, a torque-proof connection between the adapter component 8 and the planetary carrier 3 is achieved.

Figure 2:
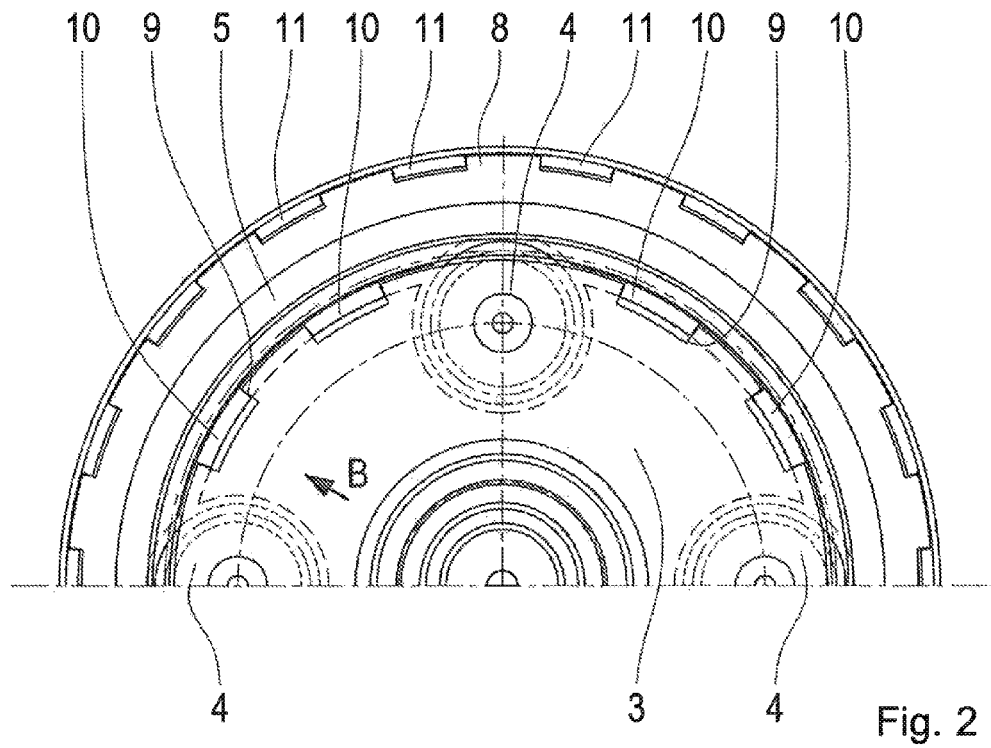
FIG. 2: a view along the line A-A shown in FIG. 1.
Figure 3:
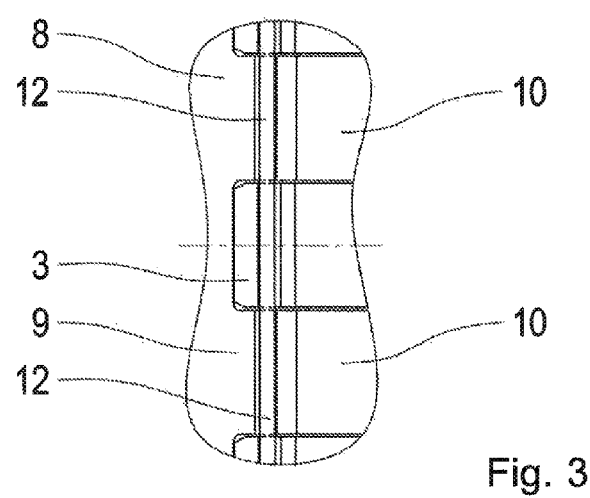
FIG. 3: a view in the direction of the arrow B shown in FIG. 2.

The toothing is shown in FIGS. 2 and 3 and is provided with the reference sign 9, whereas the fingers are provided with the reference sign 10. Preferably, the adapter component 8 is designed as finger-shaped only in the direction of the side turned toward the mounting, i.e, not locked in the circumferential direction, as illustrated on the basis of the figures; on the mounting side, the adapter component 8 is preferably designed to be locked in a circumferential direction.

The axial fixing of the adapter component 8 is effected by means of a retaining ring 12 shown in FIGS. 1 and 3, which is mounted in a groove in the planetary carrier 3 and the adapter component 8. Thereby, in an advantageous manner, the planetary carrier 3 and the components connected to the planetary carrier 3, or to the adapter component 8, can also be axially fixed. In accordance with an additional form of the invention, the retaining ring 12 may also be designed to be conical, in order to prevent tolerance-related axial backlash. In addition, by means of the retaining ring 12, the axial fixing can take place in both directions, by which the necessity of mechanical stops is rendered inapplicable.

In the example shown in FIGS. 1, 2 and 3, the adapter component 8 features a disk-shaped structural element 13 that is guided, viewed radially, outward by the ring gear parts 5, 6, with which it is connected, preferably welded, which features means for a connection with an additional component. With the example shown, the disk-shaped structural element 13 features recesses 11 running in an axial direction or toothing for a connection with an additional component, which in the present example is a shaft 14.

Alternatively, the adapter component 8 may be designed in one piece and in a cross-section L-shape, whereas the end of the adapter component 8 turned away from the planetary carrier 3 in a mounted state features means for the connection with an additional component, in order to enable a torque-transferring or torque-supporting operative connection between the planetary carrier 3 and the additional component.

The adapter component 8 may be connected on the mounting side to the additional components, or may be designed in one piece with this. With the example shown, and with reference to FIG. 1, an additional ring gear 15 of an additional planetary gear set of the transmission shown in planetary design is connected to the adapter component 8 on the mounting side, whereas the adapter component 8 and the additional ring gear 15 can be designed in one piece, by which a separate axial fixing for the additional ring gear 15 is advantageously rendered unnecessary.

In accordance with the invention, the centering between the adapter component 8 and the planetary carrier 3 is effected by means of the operative connection between the toothing 9 of the planetary carrier 3 and the fingers 10 of the adapter component 8 in a mounted state. Through the centering that is thereby effected, additional components connected to the planetary carrier 3 or to the adapter component 8 can be centered.

Modifications and variations can be made to the embodiments illustrated or described herein without departing from the scope and spirit of the invention as set forth in the appended claims.

The invention claimed is:

1. A planetary gear set, comprising:
a sun gear;
multiple planetary gears mounted on a planetary carrier;
a ring gear enclosing the planetary gears, the ring gear designed in split form perpendicular to its axis of rotation and formed from two ring gear parts arranged coaxially to each other;
an adapter component mounted to the planetary carrier and, for the purpose of a torque-transferring or torque-supporting operative connection of the planetary carrier, is engaged in a torque-proof manner to an additional component and is guided, viewed radially, outward by the ring gear parts;
a torque-proof, positive-locking connection between the adapter component and the planetary carrier in a mounted state of the adapter component on the planetary carrier; and
wherein the adapter component, in a mounted state with the planetary carrier, is connected to the planetary carrier by means of axially extended fingers, the fingers gripping between toothing arranged in the circumferential direction on the planetary carrier, between the planetary gears, wherein a torque-proof connection between the adapter component and the planetary carrier and centering of the adapter component are achieved.

2. The planetary gear set according to claim 1, wherein the adapter component is axially fixed by a retaining ring that is mounted in a groove in the planetary carrier and in the adapter component.

3. The planetary gear set according to claim 2, wherein an end of the adapter component turned away from the planetary carrier is configured to connect to a second additional component or a torque-transferring or torque-supporting operative connection between the planetary carrier and the additional component.

4. The planetary gear set according to claim 1, wherein the adapter component comprises a disk-shaped structural element that is guided, viewed radially, outward by the ring gear parts.

5. The planetary gear set according to claim 1, wherein the adapter component is designed in one piece with an L-shaped cross-section.

6. The planetary gear set according to claim 1, wherein the adapter component is connectable to or designed in one piece with the additional component.

* * * * *